United States Patent [19]

Levinson et al.

[11] 3,769,041

[45] Oct. 30, 1973

[54] METHOD OF DYEING PROTEIN SEED PARTICLES

[75] Inventors: Arthur A. Levinson, Chicago; Kenneth B. Basa, Evanston, both of Ill.

[73] Assignee: National Can Corporation, Chicago, Ill.

[22] Filed: Oct. 2, 1970

[21] Appl. No.: 77,698

[52] U.S. Cl. .............................. 426/250, 426/377
[51] Int. Cl. ........................... A23l 1/26, A23l 1/20
[58] Field of Search ............... 99/99, 148, 83, 20 E, 99/98, 166, 80 PS, 21; 117/100

[56] References Cited
UNITED STATES PATENTS

| | | | |
|---|---|---|---|
| 1,729,590 | 9/1929 | Morris | 99/148 R |
| 2,428,665 | 10/1947 | Harrel et al. | 99/148 R |
| 2,162,729 | 6/1939 | Levinson et al. | 99/20 E |
| 3,112,220 | 11/1963 | Heiser et al. | 99/166 X |
| 1,877,641 | 9/1932 | Bolton et al. | 99/166 X |

OTHER PUBLICATIONS

Furia, Ed. Handbook of Food Additives, Chem. Rubber Co. Cleveland, Ohio, 1968 pp.31, 38–39. 39.

Primary Examiner—A. Louis Monacell
Assistant Examiner—J. M. Hunter
Attorney—James E. Anderson and Donald A. Peterson

[57] ABSTRACT

A process for evenly distributing food dye or similar coloring matter on the surface of vegetable protein seed meal material in particulate flake or grit form is provided which comprises incorporating the coloring material in a polyhydroxy alcohol carrier and applying the resulting carrier admixture to the particulate protein seed meal material with agitation until the distribution on the surface of the particulate is essentially complete. The coloring matter is fixed in the product by compaction of the resulting colored particulate under heat and pressure to produce a uniformly colored vegetable protein seed meal based product which is resistant to color extraction by water under typical aqueous food processing condition customarily.

9 Claims, No Drawings

METHOD OF DYEING PROTEIN SEED PARTICLES

BACKGROUND OF THE INVENTION

1. FIELD OF THE INVENTION

This invention relates to methods of incorporating food coloring matter onto the surface of vegetable protein seed meal materials in particulate form and to the uniform incorporation of said food colors uniformly throughout said vegetable protein base.

2. Description of the Prior Art

The prior art discloses the use of various coloring materials for the coloration of vegetable protein food products intended for human or animal consumption. These colors or dyes are frequently referred to as F, D & C food colors to indicate their approval for use in foods and their appearance in the approved Food, Drug and Cosmetic list. Ordinarily these colors are water soluble dyes which are used in producing products for commerce which will have a uniform color, particularly where the raw materials have variable color characteristics in their natural state. It has been found that the colors on the approved list which are soluble in water have a pronounced affinity for vegetable protein materials and particularly defatted vegetable seed protein materials. For example, it has been observed that when approved food dyes are incorporated in water solution and the water solution applied to an agitated mass of particulate vegetable protein materials, by spraying or the like, that little or no distribution of the color occurs. It has been determined that this phenomenon is due to the fact that a water solution of the approved dyes or food colors on contact with a seed protein material immediately penetrates the material and the dye portion is adsorbed intensely throughout the particulates where the water droplet made initial contact. By virtue of this rapid adsorption of the dye material there is and can be little or no further distribution of the coloring matter on the particulates which are removed from the immediate point of contact by the aqueous color solution and no amount of further mixing will achieve further distribution of the color. The final product then resembles a mass of proteinaceous seed material particulates basically of the same initial color as the starting material wherein the color is found only on widely separated, though intensely colored, particles of seed meal. Attempts to distribute coloring material throughout a large mass of vegetable seed meal particulates by the use of a large amount of a finely divided spray of food dye in aqueous solution which were applied to the seed meal during agitation were not successful. While some distribution of color can be achieved in this manner, it requires very large amounts of dye since in effect each particle must be contacted with the aqueous dye solution in order for dying to take place and mixing provides no dye distribution. The problem is further complicated since large volumes of water are required for this procedure which must be removed by a subsequent drying step at considerable cost in both handling expense and heat requirement for the dehydration procedure. It has also been determined that when the particulates have been colored by such water spray to produce the aforesaid result, i.e., widely spaced colored particles, that further treatment by way of compaction in an expeller-extruder does not produce a uniformly colored product but rather a mottled product. Accordingly, it would be desirable to provide a procedure for incorporating coloring matter on the surface of vegetable seed protein particulates which would achieve even distribution of color on the product using a minimum of dying material and furthermore, not required large volumes of water which would have to be removed by a subsequent drying step. This physical form is contrasted with the typical form of vegetable seed protein materials such as soybean meal or grit as they appear in commerce, most commonly as a grit or flake, usually from 10 to 30 or 40 mesh particle size (U.S. Standard Sieve Series).

SUMMARY OF THE INVENTION

This invention relates to a process for uniformly distributing food dye coloring matter on the surface of vegetable protein seed meal materials in particulate form which process comprises incorporating coloring matter in a polyhydroxy alcohol carrier and applying the resulting carrier admixture to the vegetable protein particulate with agitation until distribution on the surface of the particulates is essentially complete.

A further aspect of this invention is the distribution and fixing of the coloring matter uniformly throughout the vegetable seed protein material by compaction of the resulting colored particulate under conditions of heat and pressure to produce a uniformly colored proteinaceous vegetable seed meal based protein product which is resistant to color extraction under aqueous food processing conditions customarily involved in further cooking and sterilization in preparation for consumption.

The vegetable protein starting materials used in this invention are vegetable protein containing seed meal materials in particulate form. The vegetable protein materials include products known as seed meals such as soybean meal, cotton seed meal, sunflower seed meal, and peanut meal, of which soybean meal is the most preferred. Preferably the vegetable protein seed meals are those which have been defatted and/or dehulled. They are customarily sold in the form of grits, meals or flakes having a particle size in the range of from about −10 ranging down to about 30 or possibly 40 mesh.

The polyhydroxy alcohols which are employed as carriers in the processes of the present invention are non-toxic food grade materials preferably selected from the group consisting of glycerin, propylene glycol and butylene glycol (1,3-butanediol) or mixtures thereof.

The food colors which are used in the processes of this invention are approved non-toxic F, D & C dyes and vegetable colors (caramel color). Caramel color in combination with the dyes utilized is particularly desirable to simulate the brownish-red colors of beef which often require dye admixtures which dye admixtures when utilized by themselves to color the product without use of the caramel color can permit color changes when such dyed or colored product is subject to processing (autoclaving, etc.) Generally speaking, these dyes are incorporated into the carrier in concentrations ranging from about 1–10 percent, although this is dependent on the solubility thereof. The carrier containing the dye is applied to the vegetable seed meal particulate preferably by permitting a fine stream of spray of the dye solution to be applied to a mass of vegetable seed meal particulates during agitation of said mass followed by further mixing after the desired quantity of dye and carrier has been incorporated therein. The ratio of carrier-color admixture to particulate vegetable protein seed meal is from about 2 to 5 gallons per ton of seed meal material.

Caramel colorants are characteristically very sticky, readily ball and if used alone to color seed meal material are extremely difficult to distribute and result in a product having unacceptable color distribution. If, on the other hand, sufficient water is utilized with such caramel color to achieve distribution over the seed meal material, problems associated with the necessary removal of the attendant moisture arise. By employing caramel color in the polyhydroxy alcohol carrier color distribution is markedly enhanced without such problems.

After the distribution, the products are compacted by passage through a high pressure extruder-plasticator machine such as an Anderson Machine manufactured by the V. D. Anderson Company of Cleveland, Ohio, or expellers such as are manufactured by the Fujika Company, Ltd. of Tokyo, Japan. These machines are used to compact and compress a vegetable seed protein grit or flake. They commonly employ a screw compression chamber which subjects the grits to ever-increasing pressure during passage through the chamber. Some of these machines are called expeller-expanders, but the expression "expander" is employed to designate only a partial release of pressure in the screw chamber as opposed to an "expansion" of the products being worked. The pressures employed for compaction in these machines range from about 2,000 to 5,000 pounds per square inch and temperatures (usually friction generated) 100°C. The most preferred procedure permits moisture in the vegetable seed protein grit or meal (3 to 12 or 14 percent) to be converted to steam to thereby de-bitter or additionally de-bitter the seed material such as a soy product and also toast the same. The preferred procedure for processing the products by the method of this invention is set out in Levinson, U. S. Pat. No. 2,162,729. The product by virtue of the compaction step has color uniformly distributed throughout the final material. Furthermore, the compaction process results in a fixing of the color to render the same resistant to water extraction during further processing. It should be understood the products of this invention after compaction are used as vegetable protein foods which may or may not be mixed with other materials such as meat. The products are especially useful as protein food sources when mixed with other protein materials as pet foods. For consumer appeal to simulate meat they are desirably colored. Since processing of the materials involves heating, reconstitution, retorting and/or sterilizing in the presence of moisture, it is important that the coloration added to the products be resistant to extraction by water. It has been found that this desideratum is accomplished by the process of this invention.

DESCRIPTION OF THE PREFERRED EMBODIMENTS

The following examples illustrate various procedures employed in the process of the present invention. In these examples 100 ml. carrier solution is prepared as follows:

EXAMPLE 1

| | |
|---|---|
| Solvent | 60 ml. |
| F, D & C Colors: | |
| Red — No. 3 | 2.3 g. |
| Violet — No. 1 | 0.20 g. |
| Yellow — No. 5 | 0.29 g. |

The colors are dissolved and the volume brought to 100 ml. of final solution. The solution was added at a rate of 6.75 ml. per 500 grams of soybean grits (defatted and dehulled) 95 percent (−10 to 30 mesh) over a 3 minute period at ambient temperature. The grits are agitated during the addition in a Hobart planetary mixer. The rate of addition is equivalent to 3 gallons per ton of meal. The following results were obtained:

TABLE

| RUN | CARRIER (Percentage of Each Component) | | | |
|---|---|---|---|---|
| | Propylene Glycol | Glycerin | Water | Butylene Glycol |
| A | 100 | 0 | | |
| B | 75 | 25 | | |
| C | 50 | 50 | | |
| D | 35 | 65 | | |
| E | 25 | 75 | | |
| F | 15 | 85 | | |
| G | 0 | 100 | | |
| H | | | 100 | |
| J | | | | 100 |
| K | | 50 | | 50 |
| L | 50 | | | 50 |

The color distribution in each case was excellent except for Run H where the color was adsorbed in a few particles of seed meal and instantly absorbed without distribution. The product of Run H has a basic tan color of the starting meal with widely spaced, intensely colored particles present. The other meals were of a uniform reddish color. The meals were passed through a modified Anderson machine for compaction. All products except H were evenly colored. H was tannish and mottled with red streaks. Extraction of the compacted products with water indicated good color fixation.

EXAMPLE 2

| | |
|---|---|
| Solvent | 60 ml. |
| F, D & C Colors: | |
| Red — No. 3 | 2.3 g. |
| Violet — No. 1 | 0.20 g. |
| Yellow — No. 5 | 0.29 g. |

The colors are dissolved and the volume brought to 70 ml. to which is added 30 ml. of double strength caramel color (2X) to make 100 ml. of carrier. Commercially available double strength (2X) caramel colorant contains an appreciable quantity of moisture (about 50 percent). This added moisture when incorporated into the carrier is extensively diluted and after distribution on the product does not materially effect the moisture content thereof. The carrier was added at a rate of 6.75 ml. per 500 grams of soybean grits (defatted and dehulled) 95 percent (−10 to 30 mesh) over a 3 minute period at ambient temperature. The grits are agitated during the addition in a Hobart planetary mixer. The rate of addition is equivalent to 3 gallons per ton of meal. The results obtained using runs identical to those tabulated in Example 1 are:

The color distribution in each case was excellent except for Run H where the color was adsorbed on a few particles of seed meal and instantly absorbed without distribution. The product of Run H has a basic tan color of the starting meal with widely spaced, instensely colored particles present. The other meals were of a uniform reddish brown color. The meals were passed through a modified Anderson machine for compaction. All products except H were evenly colored. H was tannish and mottled with red streaks. Extraction of the compacted products with water indicated good color fixation.

EXAMPLE 3

The following is a 2-ton commercial batch:

| | |
|---|---|
| F, D & C — Red No. 3 | 571 grams |
| F, D & C — Violet No. 1 | 51 grams |
| F, D & C — Yellow No. 5 | 71.4 grams |
| Glycerine | 1 gal. 20 oz. |
| Propylene glycol | to make 4 gal. 60 oz. |
| Caramel Color (2X) | 2 gals. |

The product is applied to 2 tons of soybean grits to produce a uniform product. Similar results were obtained using sunflower seed meal, cottonseed meal and peanut meal as the vegtable protein base to produce uniform colored products which could be readily compacted.

We claim:

1. A process for uniformly distributing food coloring material on the surface of defatted dehulled vegetable protein meal having a particle size from about −10 to about 40 mesh, containing from about 2 to about 14 percent moisture and selected from the group consisting of soybean meal, cottonseed meal, sunflower seed meal and peanut meal, which comprises:
    a. incorporating food coloring dye material in a non-toxic polyhydroxy alcohol carrier selected from the group consisting of glycerol, propylene glycol, butylene glycol and mixtures thereof to form a solution therefrom; and applying said carrier solution to the surface of said vegetable protein seed meal with concomitant agitation until said carrier solution is uniformly distributed on and dyes the surface of the meal.

2. A process according to claim 1 wherein the seed meal is soybean meal.

3. A process according to claim 1 wherein the carrier is a bland of glycerol and propylene glycol.

4. A process according to claim 1 wherein the carrier is a blend of 1 part glycerol and 3 parts propylene glycol.

5. A process according to claim 1 wherein the food color is an F, D & C food color.

6. A process according to claim 1 wherein the food color is a combination of an F, D & C food color and caramel color.

7. A process according to claim 1 wherein the polyhydroxy alcohol and food coloring dye solution is employed in the process at a ratio of from 2 to 5 gallons per ton of vegetable protein seed meal particulate.

8. A process for providing a compacted vegetable protein food product having an essentially uniform and fixed color throughout which comprises:
    a. incorporating a non-toxic food coloring dye material in a non-toxic polyhydroxy alcohol carrier selected from the group consisting of glycerol, propylene glycol, butylene glycol and mixtures thereof to form a solution therefrom;
    b. applying said carrier solution to the surface of defatted, dehulled vegetable protein seed meal having a particle size from about −10 to about 40 mesh containing about 2 to about 14 percent moisture and selected from the group consisting of soybean meal, cottonseed meal, sunflower seed meal and peanut meal, with concomitant agitation of the meal and carrier until said carrier admixture is uniformly distributed on the surface of the meal particles; and
    c. compacting said colored vegetable protein seed meal in a compactor at pressures of from 2,000 to about 5,000psi to provide a compacted food product having a substantially uniform color throughout.

9. A process according to claim 8 wherein the polyhydroxy alcohol and food coloring dye solution is employed in the process at a ratio of from 2 to 5 gallons per ton of vegetable protein seed meal particulate.

* * * * *